(12) United States Patent
Cheng et al.

(10) Patent No.: US 9,647,272 B1
(45) Date of Patent: May 9, 2017

(54) SURFACE-TREATED COPPER FOIL (71) Applicant: Chang Chun Petrochemical Co., Ltd., Taipei (TW)

(72) Inventors: Kuei-Sen Cheng, Taipei (TW); Yao-Sheng Lai, Taipei (TW); Hsi-Hsing Lo, Taipei (TW); Huei-Fang Huang, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 0 days.

(21) Appl. No.: 14/995,950

(22) Filed: Jan. 14, 2016

(51) Int. Cl.
| | | |
|---|---|---|
| *H01M 4/133* | (2010.01) | |
| *H01M 10/052* | (2010.01) | |
| *H01M 4/66* | (2006.01) | |
| *C25D 3/56* | (2006.01) | |
| *C25D 7/00* | (2006.01) | |
| *H01M 10/0525* | (2010.01) | |
| *H01M 4/04* | (2006.01) | |

(Continued)

(52) U.S. Cl.
CPC ............ *H01M 4/667* (2013.01); *C25D 3/565* (2013.01); *C25D 7/00* (2013.01); *H01M 4/043* (2013.01); *H01M 4/0404* (2013.01); *H01M 4/0471* (2013.01); *H01M 4/1393* (2013.01); *H01M 4/661* (2013.01); *H01M 4/662* (2013.01); *H01M 10/0525* (2013.01); *H01M 2004/027* (2013.01)

(58) Field of Classification Search
CPC ...... H01M 4/133; H01M 4/583; H01M 4/661; H01M 4/70; H01M 10/052; H01M 4/667; H01M 4/662; H01M 4/0404; H01M 4/0471; H01M 10/0525; C25D 3/568; C25D 7/00

USPC .......................................................... 429/213
See application file for complete search history.

(56) References Cited

U.S. PATENT DOCUMENTS

| | | |
|---|---|---|
| 5,096,546 A | 3/1992 | Kitamura et al. |
| 5,552,234 A | 9/1996 | Kawasumi |

(Continued)

FOREIGN PATENT DOCUMENTS

| | | | |
|---|---|---|---|
| JP | 09063564 A | * 3/1997 | ............. H01M 4/02 |
| JP | H0963564 A | 3/1997 | |
| WO | WO-2013105650 A1 | 7/2013 | |

OTHER PUBLICATIONS

Matienzo, L.J, et al. "Interfacial adhesion of fluoropolymer composites to commercial copper foils subjected to aqueous photolithographic processes," 1995, Abstract.

(Continued)

*Primary Examiner* — Karie O'Neill Apicella
(74) *Attorney, Agent, or Firm* — Polsinelli PC (57) ABSTRACT

The present disclosure relates to a surface-treated copper foil which exhibits excellent affinity for an active material layer that is applied to the copper foil in the manufacture of a negative electrode (anode), for use in secondary lithium-ion batteries. The copper foil is plated with chromium and zinc and subsequently subjected to an organic treatment. The surface-treated copper has a surface tension of 34 to 58 dyne/cm and a surface roughness (Rz) of 0.8 to 2.5 μm, and comprises: (a) copper foil; (b) a zinc-chromium layer plated one or both sides of the copper foil, wherein the zinc content in the zinc-chromium layer is from 10 to 120 μg/dm$^2$ and the chromium content in the zinc-chromium layer is from 10 to 35 μg/dm$^2$; and (c) an organic hydrophobic layer applied to the zinc-chromium layer.

20 Claims, 3 Drawing Sheets

(51) Int. Cl.
*H01M 4/1393* (2010.01)
*H01M 4/02* (2006.01)

(56) References Cited

U.S. PATENT DOCUMENTS

| | | |
|---|---|---|
| 6,537,675 B1 | 3/2003 | Clouser et al. |
| 6,589,381 B2 | 7/2003 | Poutasse et al. |
| 6,605,369 B1 | 8/2003 | Takahashi et al. |
| 7,651,783 B2 | 1/2010 | Tsuchida et al. |
| 7,754,981 B2 | 7/2010 | Arakawa et al. |
| 9,060,431 B2 | 6/2015 | Arai et al. |
| 9,078,353 B2 | 7/2015 | Tzou et al. |
| 2010/0038115 A1* | 2/2010 | Matsuda ............... C25D 1/04 174/254 |
| 2010/0068555 A1* | 3/2010 | Tomandl ............... B05D 7/14 428/626 |
| 2012/0258281 A1 | 10/2012 | Shinozaki et al. |
| 2012/0276412 A1* | 11/2012 | Miki ............... C23C 28/345 428/671 |
| 2014/0017564 A1* | 1/2014 | Suzuki ............... C22F 1/08 429/211 |
| 2015/0245477 A1 | 8/2015 | Arai et al. |
| 2015/0245502 A1 | 8/2015 | Moon |

OTHER PUBLICATIONS

Mahmoud El-Sharif et al., "Initial 119Sn Mössbauer Spectroscopy and X-ray Diffractometry Investigations of Electrodeposited Tin-Chromium and Tin-Zinc-Chromium Alloys," 2000, Abstract.

* cited by examiner

SURFACE-TREATED COPPER FOIL

FIELD OF THE DISCLOSURE

The present disclosure relates to an improved copper foil having excellent affinity for an active material layer that is applied to the copper foil in the manufacture of a negative electrode (anode), for use in secondary lithium-ion batteries.

BACKGROUND

A typical device for manufacturing an electrolytic copper foil comprises a metal cathode drum and an insoluble metal anode (anode), the metal cathode drum being rotatable and having a mirror polished surface. The insoluble metal anode is arranged at approximately the lower half of the metal cathode drum and surrounds the metal cathode drum. A copper foil is continuously manufactured with the device by flowing a copper electrolytic solution between the cathode drum and the anode, applying a direct current between these to allow copper to be electrodeposited on the cathode drum, and detaching an electrodeposited copper foil from the cathode drum when a predetermined thickness is obtained. The side that the electrolytic copper foil contacts with the surface of the titanium drum is referred to as "shiny side (S side)," and the back side of the electrolytic copper foil is referred to as "matte side (M side)."

The copper foil is often used as a negative current collector for lithium-ion secondary batteries and for printed wiring boards. Lithium-ion secondary batteries include a positive electrode, a negative electrode, and an electrolyte. The negative electrode typically includes carbon particles applied as a negative electrode active material layer (active carbon material) to the surface of a negative current collector made from the copper foil.

There are two types of active carbon materials that are applied to the negative current collector (the copper foil): an aqueous slurry and a solvent-based (non-aqueous slurry). The aqueous slurry uses different binders and solvents than the solvent-based slurry. The aqueous slurry usually includes a styrene-butadiene rubber (SBR), a binder, and water as the solvent. The solvent-based slurry usually includes polyvinylidene fluoride (PVDF), a binder, and a solvent such as 1-methyl-2-pyrrolidone (NMP).

Although aqueous slurries account for about 90% of the current market, solvent slurries are actually better suited for lithium-ion batteries because water is harmful to the lithium-ion battery. Solvent-based slurries are more commonly used in high-end products (for example, high C-rate charging and discharging). The Li-ion batteries for EV and power tools need to have a high C-rate charging and discharging.

When using a solvent-based slurry it is necessary for the surface of the copper foil to have an affinity to the solvent slurry to achieve good adhesion between the copper foil and the carbon active material. The slurry is applied to the copper foil and then dried with heat for up to about 10 minutes to remove the solvent (at about 100-160° C.). For solvent-based slurries that use NMP, a higher drying temperature is needed because the solvent has a higher boiling point than water. At higher temperatures, however, copper foil is more susceptible to oxidation, which leads to discoloration. Furthermore, lithium-ion batteries are often subjected to high temperatures during repeated use while charging and/or discharging (temperatures of 55° C., 5C charge and 5C discharge). When high C-rate charging and discharging is employed and temperatures rise, the anode active material layer can break down causing the batteries to fail.

The capacity of a rechargeable battery is commonly referred to as the "C-rate." The capacity of a rechargeable battery is often rated at 1C, meaning that a 1,000 mAh battery should provide a current of 1,000 mA for an hour. The same battery discharging at 0.5C would provide 500 mA for two hours, and at 2C, the 1,000 mAh battery would deliver 2,000 mA for 30 minutes. 1C is also known as a one-hour discharge; a 0.5C is a two-hour discharge, and a 2C is a half-hour discharge. When discharging a battery with a battery analyzer capable of applying different C rates, a higher C rate will produce a lower capacity reading and vice versa. By discharging the 1,000 mAh battery at the faster 2C, or 2,000 mA, the battery should ideally deliver the full capacity in 30 minutes. The sum should be the same as with a slower discharge since the identical amount of energy is being dispensed, only over a shorter time. In reality, however, internal resistance turns some of the energy into heat and lowers the resulting capacity to about 95 percent or less. Discharging the same battery at 0.5C, or 500 mA over two hours, will likely increase the capacity to above 100 percent.

SUMMARY OF THE DISCLOSURE

The present disclosure relates to an improved copper foil having excellent affinity for an active material layer that is applied to the copper foil in the manufacture of a negative electrode (anode), for use in secondary lithium-ion batteries. The copper foil is plated with a chromium and zinc and subsequently subjected to an organic treatment. After being plated with chromium and zinc, the surface of the copper foil is hydrophilic (has an affinity for water). Subsequent treatment with a silane makes the surface more hydrophobic, which improves adhesion to the active material layer. The copper foil does not discolor upon being heated at high temperatures to remove solvents from the non-aqueous slurry coating. The copper foil is also very durable and withstands high C-rate charging and discharging.

The surface-treated copper foil typically has a surface tension of 34 to 58 dyne/cm and a surface roughness (Rz) of 0.8 to 2.5 µm, wherein the surface-treated copper foil comprises: (a) copper foil; (b) a zinc-chromium layer plated one or both sides of the copper foil, wherein the zinc content in the zinc-chromium layer is from 10 to 120 µg/dm$^2$ and the chromium content in the zinc-chromium layer is from 10 to 35 µg/dm$^2$; and (c) an organic hydrophobic layer applied to the zinc-chromium layer.

The (b) zinc-chromium layer plated on one or both sides of the copper foil may have a zinc content of 30 to 120 µg/dm$^2$ and chromium content of 15 to 35 µg/dm$^2$. Also, the (c) organic hydrophobic layer may have at least one hydrophobic compound selected from the group consisting of substituted or unsubstituted: 1,2,3-benzotriazole, an alkoxysilane having 1 to 20 carbons, a vinylalkoxy silane having 1 to 20 carbons, and (meth)acryl silane. In some cases, the (c) organic hydrophobic layer comprises an alkoxysilane having 1 to 20 carbons. For example, the alkoxysilane may be $CH_3Si(OCH_3)_3$.

In some cases, the surface-treated copper foil has a zinc/chromium ratio from 0.8 to 8.

The instant disclosure also relates to an anode comprising an anode active material on an anode current collector, wherein the anode current collector comprises the surface-treated copper foil described herein; to a lithium ion secondary battery comprising the anode; and to an electronic device comprising the lithium ion secondary battery.

Finally, the instant disclosure relates to a process for making the surface-treated copper foil described herein; and to a process for making an anode comprising the surface-treated copper foil.

BRIEF DESCRIPTION OF THE DRAWINGS

Implementations of the present technology will now be described, by way of example only, with reference to the attached figures, wherein.

It should be understood that the various aspects are not limited to the arrangements and instrumentality shown in the drawings.

DETAILED DESCRIPTION OF THE DISCLOSURE

The instant disclosure is related to a surface-treated copper foil having a surface tension of 34 to 58 dyne/cm and a surface roughness (Rz) of 0.8 to 2.5 µm, wherein the surface-treated copper foil comprises:

(a) copper foil;
(b) a zinc-chromium layer plated on one or both sides of the copper foil, wherein the zinc content in the zinc-chromium layer is from 10 to 120 µg/dm$^2$ and the chromium content in the zinc-chromium layer is from 10 to 35 µg/dm$^2$; and
(c) an organic hydrophobic layer applied to the zinc-chromium layer.

The surface-treated copper foil typically has a thickness of from about 1 to about 50 µm, from about 4 to about 25 µm, from about 6 to about 20 µm, or from about 8 to about 16 µm. The surface-treated copper foil may have a thickness of about 4, 5, 6, 7, 8, 9, 10, 11, 12, 13, 14, 15, 16, 17, 18, 19, 20, 21, 22, 23, 24, 25, 26, 27, 28, 29, or 30 µm.

The zinc-chromium layer can be plated on one side of the copper foil or on both sides of the copper foil. Regardless of whether the zinc-chromium layer is on one or both sides of the copper foil, the zinc content may be from about 10, 20, 30, 40 or 50 to about 90, 100, 110, or 120 µg/dm$^2$, from about 60 to about 90 µg/dm$^2$, or from about 50 to about 80 µg/dm$^2$. The chromium content may be about 10, 15, or 20 to about 10, 15, 20, 25, or 30 µg/dm$^2$, or about 20, 21, 22, 23, 24, or 25 µg/dm$^2$.

In some cases, the surface-treated copper foil of the M-side, the S-side, or both the M-side and the Side has a zinc/chromium ratio from 0.8 to 8.

The organic hydrophobic layer of the surface-treated copper foil may contain at least one hydrophobic compound selected from the group consisting of substituted or unsubstituted: 1,2,3-benzotriazole, an alkoxysilane having 1 to 20 carbons, a vinylalkoxy silane having 1 to 20 carbons, and (meth)acryl silane. In some cases, the organic hydrophobic layer comprises an alkoxysilane having 1 to 20 carbons, for example, $CH_3Si(OCH_3)_3$. Hydrophobic and hydrophilic are frequently used descriptors of surfaces. A surface is hydrophobic if it tends not to adsorb water or be wetted by water. A surface is hydrophilic if it tends to adsorb water or be wetted by water. More particularly, the terms describe the interaction of the boundary layer of a solid phase with liquid or vapor water. Silanes can be used to modify the interaction of boundary layers of solids with water with a high degree of control, effecting variable degrees of hydrophobicity or hydrophilicity.

Examples of classes of relatively hydrophobic silane components that may be included in the hydrophobic layer of the surface-treated copper foil include, but are not limited to vinyl silanes, methacrylate silanes, sulfur silanes, mercapto silanes, epoxy silanes, phenyl silanes. Examples of particular relatively hydrophobic silane components include gamma-methacryloxypropyltrimethoxy silane, Vinyltrimethoxysilane, Vinyltriethoxysilane, Vinyltris(2-Methoxyethoxy)Silane, Vinyltrisisopropoxysilane, Vinyltris(Tert-Butylperoxy)Silane, Vinyldimethylethoxysilane, Vinylmethyldimethoxysilane, Vinylmethyldiethoxysilane, Allyltriethoxysilane, Vinyltriacetoxysilane, Vinyltrichlorosilane, Vinyldimethylchlorosilane, Vinylmethyldichlorosilane, Vinyltris(Methylisobutylketoxime)Silane, Methylvinyldi(Cyclohexanoneoxime)Silane, Methylvinyldi(Methylethylketoxime)Silane, Vinyltris(Methylethylketoxime)Silane, 3-Methacryloxypropyltrimethoxysilane, Methacryloxypropyltris(Trimethylsiloxy)Silane, 3-Methacryloxypropyltriethoxysilane, 3-Methacryloxypropylmethyldimethoxysilane, 3-Methacryloxypropylmethyldiethoxysilane, Methacryloxymethyltriethoxysilane, 3-Mercaptopropyltrimethoxysilane, 3-Mercaptopropyltriethoxysilane, 3-Mercaptopropylmethyldimethoxysilane, Bis(Triethoxysilylpropyl)Tetrasulfide, Bis(Triethoxysilylpropyl)Disulfide, Bis(Triethoxysilylpropyl)Polysulfide, Thiocyanto silane: 3-Thiocyanatopropyltriethoxysilane, 3-Glycidoxypropyltrimethoxysilane, 3-Glycidoxypropyltriethoxysilane, and 3-Glycidoxypropylmethyldiethoxysilane, 3-Glycidoxypropylmethyldimethoxysilane, and Vinyltriacetoxysilane.

The surface-treated copper foil typically has a surface tension of about 40 to about 50 dyne/cm, or about 42 to about 48 dyne/cm, or about 40, 41, 42, 43, 44, 45, 46, 47, 48, 49, or 50 dyne/cm. The surface roughness (Rz) of the surface-treated copper foil is typically about 1.0 to about 2.0 µm, or about 1.0, 1.1, 1.2, 1.3, 1.4, 1.5, 1.6, 1.7, 1.8, 1.9, or 2.0 µm. Also, the surface-treated copper foil may be free or substantially (or essentially) free of nickel.

The instant disclosure also relates to an anode comprising an anode active material on an anode current collector, wherein the anode current collector comprises a surface-treated copper foil as described herein. Typically, the anode active material layer contains a carbon material. The carbon material may be, for example, selected from the group consisting of non-graphitizing carbon, artificial graphite, coke, graphite, glasslike carbon, carbon fiber, activated carbon, and carbon black. Additionally, the anode active material layer may include a conductive material, a binder, and a non-aqueous solvent. For example, the binder may be, for example, polyvinylidene fluoride (PVDF), Poly(vinylidene fluoride-co-hexafluoropropylene) (PVDF-HFP), polyimide (PI), or a combination thereof. The non-aqueous solvent may be, for example, 1-methyl-2-pyrrolidone (NMP).

The instant disclosure further relates to a lithium ion secondary battery comprising a cathode, an anode as described above, a separator interposed between the cathode and anode, and an electrolyte. The cathode typically includes a composite lithium oxide. The lithium ion secondary battery may be used in an electronic device, for example, a power tool, an electric vehicle, a cell phone, a tablet, or a portable electronic device.

The instant disclosure relates to a method for making the surface-treated copper foil of the instant disclosure. The method typically comprises: (a) performing an electrochemical reaction to produce copper foil; (b) electroplating a zinc-chromium layer onto one or both sides of the copper foil; and (c) applying an organic hydrophobic layer onto the zinc-chromium layer. The method may further include: (d) drying the surface-treated copper foil at a temperature between 50° C. to 150° C. or 100° C. and 125° C. after (c) applying the hydrophobic layer.

The instant disclosure also relates to a process for making an anode comprising: (a) applying an anode active material to one or both sides of the surface-treated copper foil of the instant disclosure, which acts as an anode current collector; (b) curing (drying) the anode active material; and (c) pressing the anode active material that has been applied to the surface-treated copper foil and cured.

Figure 1:
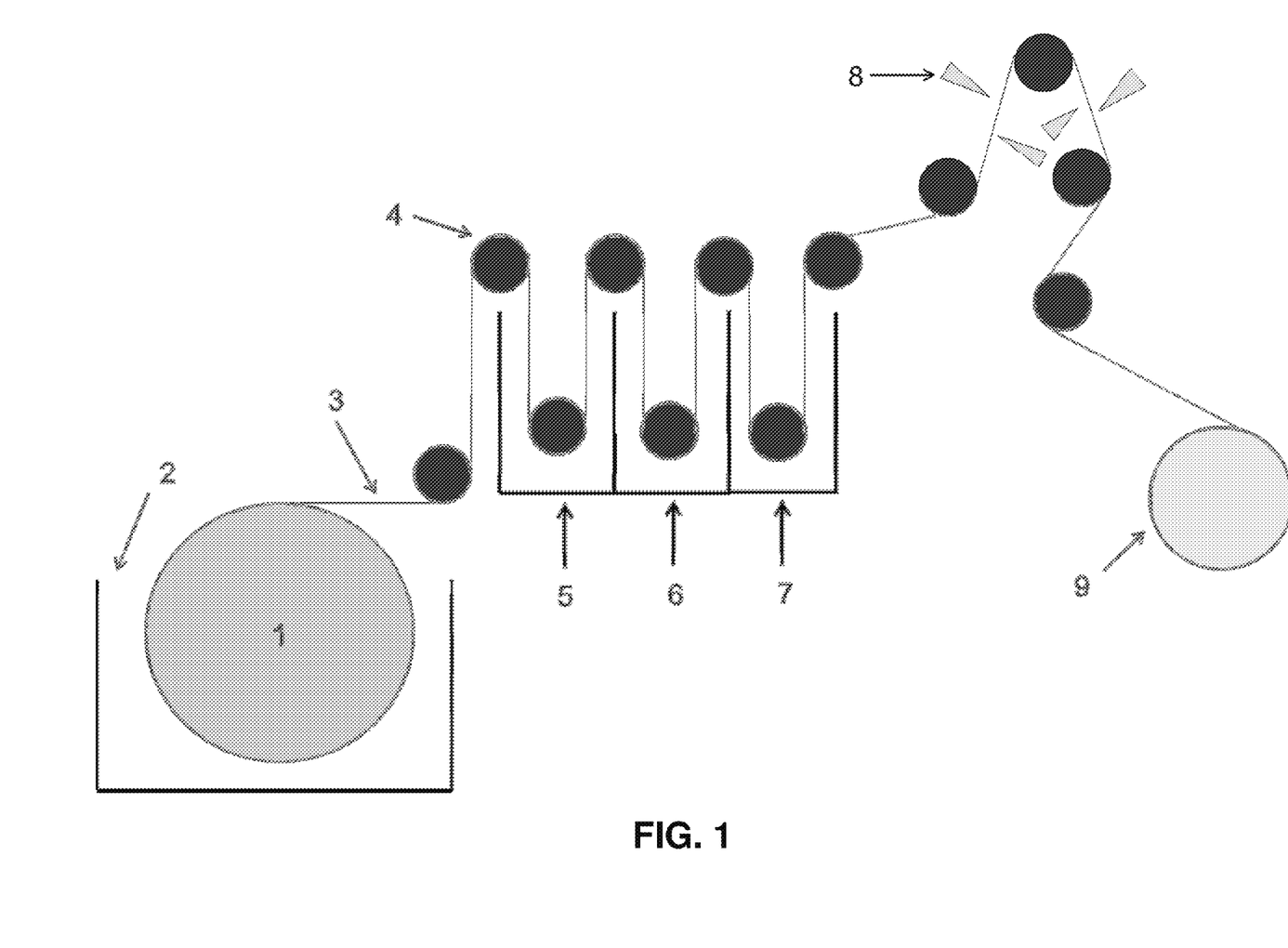
FIG. 1 is a diagram showing the manufacture and processing of copper foil.

FIG. 1 is a diagram showing a manufacturing process for surface-treated copper foil according to the instant disclosure. After being electrodeposited on cathode drum 1 in an electrolytic bath 2, the copper foil 3 is fed through a series of rollers 4. The copper foil is carried through a zinc/chromium plating treatment 5, a water rise 6, and an organic treatment 8, before being subjected to cutting with air knifes 8. Finally, the copper foil is rolled 9, and subsequently packaged for shipment.

As mentioned above, the surface-treated copper foil is particularly useful for use as an anode current collector. Often, the copper foil is coated on one or both sides with an anode active material (or just "active material"). The active material may form one or more layers on or around the anode current collector and often contains carbon material. In such cases, the active material is sometimes referred to as a "carbonaceous material." Typical, non-limiting carbon materials include non-graphitizing carbon, artificial graphite, coke, graphite, glasslike carbon, carbon fiber, activated carbon, and carbon black.

The active material and/or carbonaceous material may include a conductive additive, a thickening agent, and/or a binder. The copper foils of the instant disclosure are useful in batteries, electronic devices comprising the batteries, and/or in the electronic devices themselves (not in the battery). For example, the copper foil may be used in electronic devices such as power tools, automobiles, electric vehicles including electric automobiles, cell phones, tablets, other portable electronic devices, etc.

The anode current collectors are suitable for use in lithium ion secondary batteries. These batteries typically include a positive electrode, a negative electrode (an anode) capable of absorbing and desorbing lithium ions, a separator interposed between the positive electrode and the negative electrode, and an electrolyte.

With respect to the structure or type of the secondary battery in which the copper foil of the instant disclosure may be incorporated, there is no particular limitation, and the secondary battery may be of a stack type including a negative electrode and a positive electrode stacked through a separator, or a spirally wound type including a continuous electrode and a separator spirally wound together. With respect to the form of the secondary battery, there is no particular limitation, and the secondary battery may be of a cylinder type widely used in laptop personal computer (PC) and the like, a rectangle type (rectangular cylinder type) used in portable phone, a button type, or a coin type. As a packaging material for the secondary battery, a typical aluminum can, stainless steel can, laminated film, or others can be used.

Figure 2:
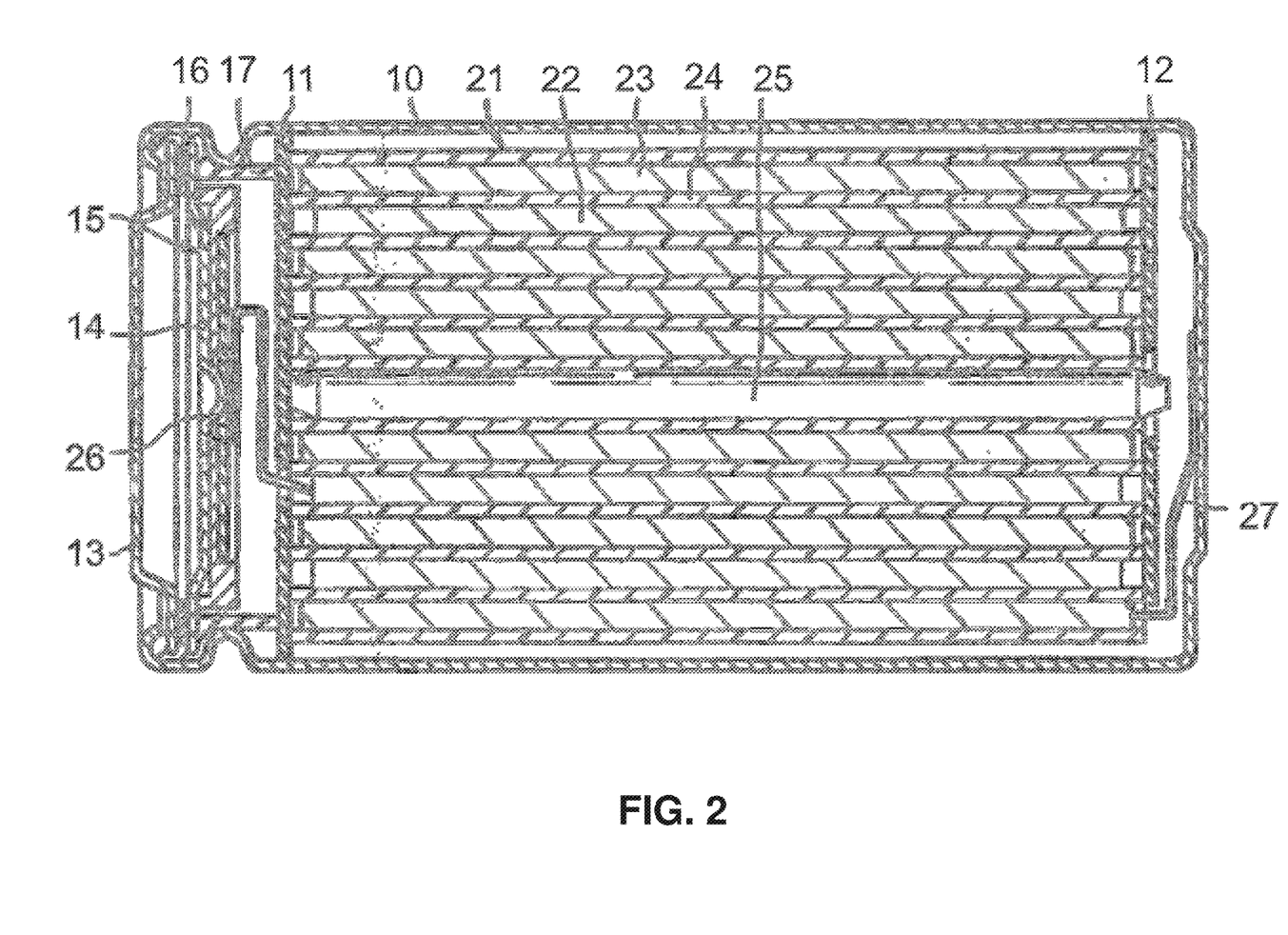
FIG. 2 is a cross section of a non-aqueous electrolyte lithium-ion secondary battery.

FIG. 2 shows the cross sectional structure of a non-aqueous electrolyte secondary battery of the cylindrical type. In a battery can 10 having a substantially hollow cylindrical column shape, a rolled electrode body 21 obtained by rolling a band-shaped positive electrode 22 and negative electrode 23 with a separator 24 in-between is provided. The battery can 10 is made of, for example, iron (Fe) plated with nickel (Ni). One end of the battery can 10 is closed and the other end is open. A pair of insulating plates 11 and 12 is placed vertical to the peripheral face of the roll so as to sandwich the rolled electrode body 21.

A battery cover 13, and a safety valve mechanism 15 and a PTC (positive temperature coefficient) device 16 which are provided inside the battery cover 13 are attached to the open end of the battery can 10 by being, caulked through a gasket 17, and the battery can 10 is sealed. The battery cover 13 is made of, for example, a material similar to that of the battery can 10. The safety valve mechanism 15 is electrically connected to the battery cover 13 through PTC device 16. When an internal short circuit occurs or the internal pressure of the battery increases to a predetermined value or higher due to heating from outside or the like, a disk plate 14 is turned upside down, thereby disconnecting the electrical connection between the battery cover 13 and the rolled electrode body 21. The PTC device 16 is used to limit a current by an increase in resistance value when the temperature rises to thereby prevent abnormal heating caused by a heavy current. The PTC device 16 is made of, for example, barium titanate based semiconductor ceramics, mixture conductive particle and polymer material. The gasket 17 is made of, for example, an insulating material and asphalt is applied thereon.

The rolled electrode body 21 is rolled around, for example, a center mandrel 25 as a center. A positive electrode lead 26 made of aluminum A) is connected to the positive electrode 22 and a negative electrode lead 27 made of nickel (Ni) is connected to the negative electrode 23. The positive electrode lead 26 is electrically connected to the battery cover 13 by being welded to the safety valve mechanism 15 while the negative electrode lead 27 is electrically connected to the battery can 10 by being welded.

The positive electrode 22 is composed of, for example, a positive electrode mixture layer and a positive electrode collector layer in a structure that the positive electrode mixture layer is provided on one side or both sides of the positive electrode collector layer. The positive electrode collector layer is made of, for example, metallic foil such as aluminum foil, nickel foil, or stainless foil. The positive electrode mixture layer contains, for example, manganese-contained complex oxide and nickel-contained complex oxide as will be described hereinafter, and further contains a conductive material such as graphite and a binder such as polyvinylidene fluoride when necessary.

The negative electrode 23 has a structure in which, for example, a negative electrode mixture layer is provided on one or both sides of a negative electrode collector layer like the positive electrode 22. The negative electrode collector layer is formed of copper foil according to the instant disclosure. The negative electrode can occlude or release lithium at a potential of, for example, 2 V or less with the lithium metal potential being the standard.

Examples of the material for a negative electrode capable of occluding and releasing lithium are a metal or a semiconductor capable of forming alloy or compound with lithium, and the alloy and compound of these. These materials are preferable since an excellent battery capacity can be obtained. Examples of the metals, the semiconductors, and alloys and compounds of those are magnesium (Mg), boron (B), aluminum (Al), gallium (Ga), indium (In), silicon (Si), germanium (Ge), tin (Sn), lead (Pb), arsenic (As), antimony (Sb), bismuth (Bi), cadmium (Cd), silver (Ag), zinc (Zn), hafnium (Hf), zirconium (Zr), yttrium (Y), and alloys and compounds of these. Other example of the compound of metals and semiconductors capable of forming alloys and compounds with lithium is the ones containing at least one kind of nonmetal element and one kind of 4B-Group element except carbon (C).

Examples of the material for a negative electrode capable of occluding and releasing lithium are carbon materials, metal oxides, and polymer compounds. The carbon materials are most preferable since the materials can obtain an excellent cycle characteristic. Examples of the carbon materials are non-graphitizing carbon, artificial graphite, coke, graphite, glasslike carbon, polymer compound organic compound calcined materials, carbon fiber, activated carbon and carbon black. The coke included pitch coke, needle coke and petroleum coke. The high polymer compound calcined material is a material obtained by calcining a high polymer material such as phenolic resin or furan resin at an appropriate temperature so as to be carbonated. Examples of the metal oxides are iron oxide, ruthenium oxide and molybdenum oxide, and examples of high polymer materials are polyacetylene and polypyrrole.

The separator 24 is formed of, for example, a porous film made of polyolefin-based material such as polypropylene or polyethylene or a porous film made of an inorganic material such as ceramic nonwoven cloth. A structure in which two or more kinds of the porous films are stacked may also be used.

The separator 24 is impregnated with a liquid electrolyte. The electrolyte is obtained by dissolving, for example, lithium salt in a solvent as electrolyte salt. Examples of appropriate non-aqueous solvents are propylene carbonate, ethylene carbonate, diethyl carbonate, dimethyl carbonate, 1,2-dimethoxyethane, 1,2-diethoxyethane, .gamma.-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, ester propionitrile, anisole ester, acetate ester, ester butyrate and propionate. One of these nonaquoeous solvents alone, or two or more kinds are mixed to be used.

Examples of lithium salt are $LiClO_4$, $LiAsF_6$, $LiPF_6$, $LiBF_4$, $LiB(C_6H_5)_4$, $CH_3SO_3Li$, $CF_3SO_3Li$, LiCl and LiBr. One of the materials alone, or two or more kinds are mixed to be used.

When the secondary battery is charged, for example, lithium ions are released from the positive electrode 22 and occluded by the negative electrode 23 via the electrolyte with which the separator 24 is impregnated. When the secondary battery is discharged, for example, lithium ions are released from the negative electrode 23 and occluded by the positive electrode 22 via the electrolyte with which the separator 24 is impregnated. The positive electrode 22 is formed containing the manganese-contained complex oxide including the first element, and the nickel-contained complex oxide including the second element so that the battery capacity can be maintained even after preservation at a high temperature, thereby obtaining a high capacity retention ratio. Also, a large discharging energy can be obtained when a high load discharging is performed under the condition of high potential cutoff at, for example, 3.3 V.

Figure 3:
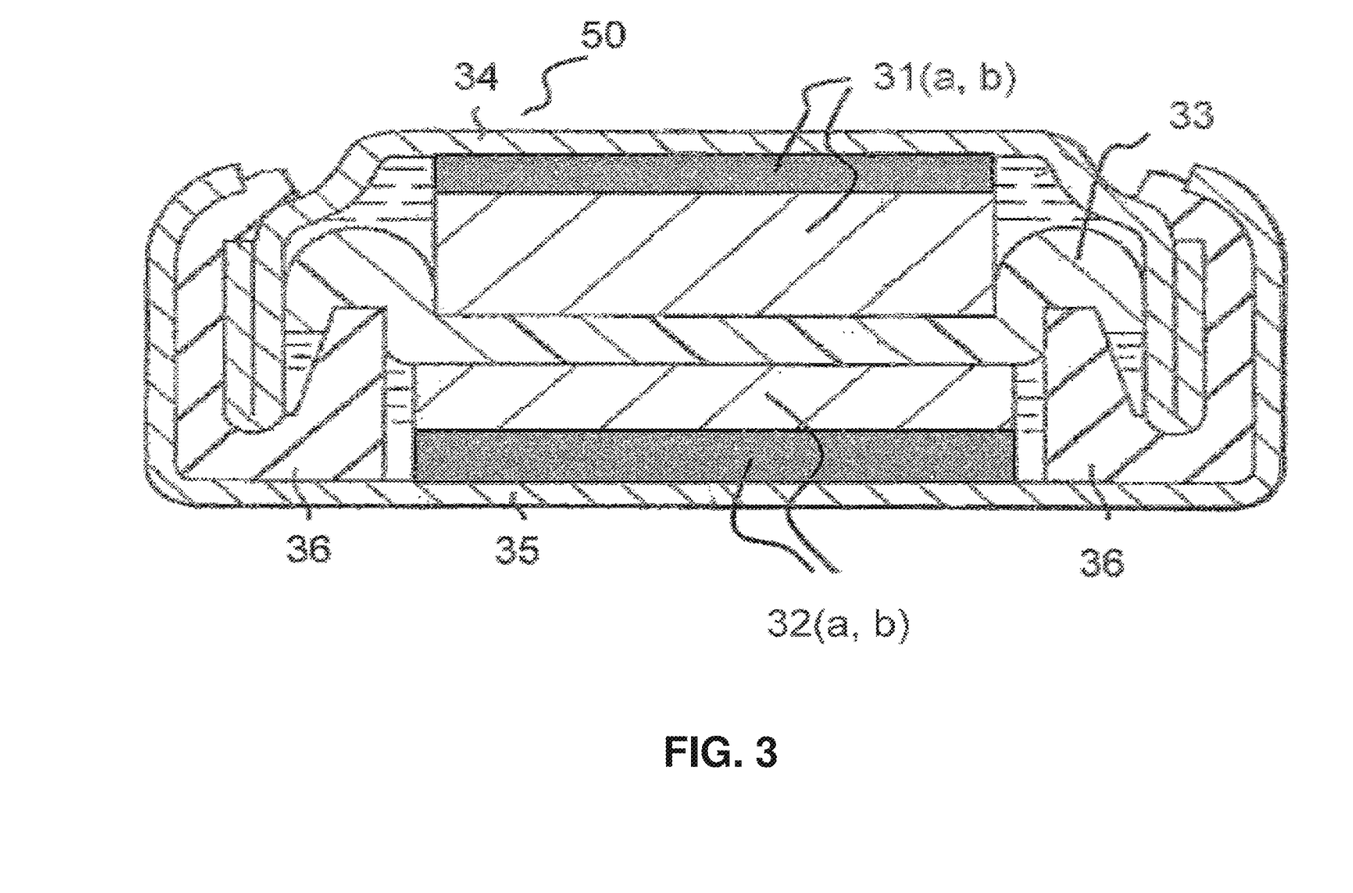
FIG. 3 is across-sectional view showing another example (coin type) of a lithium-ion secondary battery.

FIG. 3 is a cross-sectional view showing a coin-type lithium-ion secondary battery. The secondary battery 50 includes a negative electrode 31 contained in a packaging cup 34 and a positive electrode 32 contained in a packaging can 35, which are stacked through a separator 33. The edges of the packaging cup 34 and packaging can 35 are caulked through an insulating gasket 36 to close the battery. Each of the packaging cup 34 and the packaging can 35 is made of a metal, such as stainless steel or aluminum (Al).

The negative electrode current collector 31a comprises a copper foil according to the instant disclosure. The copper foil is capable of forming an alloy together with the anode active material layer 31b. In this case, the formation of an alloy improves the adhesion between the anode active material layer 31b and the negative electrode current collector 31a, and hence the anode active material is prevented from being finely divided due to the expansion or shrinkage caused during the charging or discharging, thus preventing the anode active material layer 31b from being removed from the negative electrode current collector 31a. In addition, there can be obtained an advantage in that the electron conduction of the negative electrode 31 is improved.

The negative electrode current collector 31a may be made of either a single layer or a plurality of layers of copper foil. When the negative electrode current collector is made of a plurality of layers, it is preferred that the layer in contact with the anode active material layer 31b is made of a metal material capable of forming an alloy together with silicon and the other layer(s) is (are) made of a metal material which does not form an intermetallic compound together with lithium.

The surface of the negative electrode current collector 31a on which the anode active material layer 31b will be formed may be roughened. The anode active material layer 31b contains as an anode active material at least one member selected from a simple substance of silicon and a compound thereof, and a simple substance of tin and a compound thereof, and especially preferably contains silicon. Silicon has both excellent ability to form an alloy together with lithium ions and excellent ability to extract lithium ions from the alloyed lithium, and, when silicon is used for forming a lithium-ion secondary battery, a secondary battery having a large energy density can be achieved. Silicon may be contained in any form of a simple substance, an alloy, a compound, and a mixture thereof.

The anode active material layer 31b may be either of a coating type having a thickness of about 70 to 80 μm or of a thin film type having a thickness of about 5 to 6 μm.

The anode active material layer 31b of a coating type is formed, on the negative electrode current collector 31a, from fine particles of an anode active material made of at least one member selected from a simple substance of silicon and a compound thereof, and a simple substance of tin and a compound thereof, and optionally a conductor, such as a carbon material, and a binder, such as polyimide or polyvinyl fluoride. The anode active material layer 31b of a thin film type is formed, on the negative electrode current collector 31a, from an anode active material layer 31b made of at least one member selected from a simple substance of silicon and a compound thereof, and a simple substance of tin and a compound thereof.

The anode active material layer 31b may contain oxygen as a constituent element. Oxygen can suppress expansion and shrinkage of the anode active material layer 31b and prevent the lowering of the discharge capacity and the expansion. It is possible that at least part of the oxygen contained in the anode active material layer 31b is bonded to silicon, and the silicon bonded may be present in the form of silicon monoxide or silicon dioxide or in another metastable state. In some cases, the oxygen content of the anode active material layer 31b is in the range of from 3 to 45 atomic %. The anode active material layer 31b may contain at least one constituent element other than silicon and oxygen. Examples of such elements include cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), and chromium (Cr).

The positive electrode 32 includes a positive electrode current collector 32a, and a cathode active material layer 32b formed on the positive electrode current collector 32a. The positive electrode current collector 32a is typically made of a metal material, such as aluminum, nickel, or stainless steel. The cathode active material layer 2b may contain, for example, as a cathode active material, at least one material which is capable of extracting lithium ions during the charging and re-occluding lithium ions during the discharging, and optionally a conductor, such as a carbon material, and a binder, such as polyvinylidene fluoride.

As a material capable of extracting and re-occluding lithium ions, preferred is a lithium-transition metal compound oxide including lithium and a transition metal element M, and being represented by, e.g., the general formula: $Li_xMO_2$. When the lithium-transition metal compound oxide is used in a lithium-ion secondary battery, the oxide can generate high electromotive force, and has a high density and hence can further increase the capacity of the secondary battery. In the above formula, M represents at least one transition metal element, preferably, e.g., at least one element selected from cobalt and nickel, and x varies depending on the charged state (or discharged state) of the battery, and is generally a value in the range of $0.05 \leq x \leq 1.10$. Specific examples of the lithium-transition metal compound oxides include $LiCoO_2$ and $LiNiO_2$.

When a particulate lithium-transition metal compound oxide is used as a cathode active material, either the powder may be used as it is, or at least part of the particulate lithium-transition metal compound oxide may have formed a surface layer including at least one member selected from the group consisting of an oxide having a composition different from that of the lithium-transition metal compound oxide, a halide, a phosphate, and a sulfate. In the latter case, the stability can be improved, making it possible to more surely suppress the lowering of the discharge capacity. In this case, the constituent element of the surface layer and the constituent element of the lithium-transition metal compound oxide may diffuse into each other.

The cathode active material layer 32b may contain at least one member selected from the group consisting of a simple substance and a compound of an element belonging to Group 2, Group 3, or Group 4 of the long-form periodic table. Examples of the elements belonging to Group 2 include magnesium (Mg), calcium (Ca), and strontium (Sr), and magnesium. Examples of the elements belonging to Group 3 include scandium (Sc) and yttrium (Y), and yttrium. Examples of the elements belonging to Group 4 include titanium and zirconium (Zr), and zirconium. The above element may be present either in the form of a solid solution in the cathode active material or in the form of a simple substance or compound at the grain boundary of the cathode active material.

The separator 33 separates the negative electrode 31 from the positive electrode 32 and prevents short-circuiting of current caused due to the contact of these electrodes, and permits lithium ions to pass through it. As a material for the separator 33, for example, a thin membrane of microporous polyethylene or polypropylene having formed therein a number of micropores may be suitable.

The electrolytic solution includes, for example, a solvent and an electrolyte salt dissolved in the solvent, and may contain an additive if necessary. Examples of solvents used in the electrolytic solution include non-aqueous solvents, e.g., cyclic carbonates, such as 1,3-dioxolan-2-one (ethylene carbonate; EC) and 4-methyl-1,3-dioxolan-2-one (propylene carbonate; PC), and chain carbonates, such as dimethyl carbonate (DMC), diethyl carbonate (DEC), and ethylmethyl carbonate (EMC). These solvents may be used individually, but the two solvents or more are preferably used in combination. For example, when a high-permittivity solvent, such as ethylene carbonate or propylene carbonate, and a low-viscosity solvent, such as dimethyl carbonate, diethyl carbonate, or ethylmethyl carbonate, are used in combination, high dissolving power for an electrolyte salt and high ion conduction can be achieved. The solvent may contain sultone.

The electrolytic solution may be either used as it is or used in the form of a so-called gel electrolyte which is made of a polymer compound having the electrolytic solution. In the latter case, the separator 33 may be impregnated with the electrolyte, or the electrolyte may be present in the form of a layer disposed between the separator 33 and the negative electrode 31 or positive electrode 32. As the polymer material, preferred is, for example, a polymer containing vinylidene fluoride, which has high oxidation-reduction stability. As the polymer compound, preferred is a compound formed by polymerization of a polymerizable compound. Examples of polymerizable compounds include monofunctional acrylates, such as an acrylate; monofunctional methacrylates, such as a methacrylate; polyfunctional acrylates, such as a diacrylate and a triacrylate; polyfunctional methacrylates, such as a dimethacrylate and a trimethacrylate; acrylonitrile; and methacrylonitrile, and, of these, preferred is an ester having an acrylate group or a methacrylate group, which easily undergoes polymerization and has high polymerizable compound reactivity.

EXAMPLE 1

Copper wires were dissolved in a 50 wt % sulfuric acid aqueous solution to prepare a copper sulfate electrolyte containing 320 g/l of copper sulfate ($CuSO_4 \cdot 5H_2O$) and 100 g/l of sulfuric acid. To per liter of the copper sulfate electrolyte, 3.5 mg of gelatin (DV: Nippi Company), 1.5 mg of hydroxyethyl cellulose (LC-400; DAICEL Company) 1.2 mg of sodium 3-mercapto-1-propanesulfonate (MPS: HOPAX Company), and 25 mg chloride ion were added. Subsequently, an electrolytic copper foil with thickness of 6 μm was prepared at the liquid temperature of 50° C. and the current density of 50 $A/dm^2$.

After 6 um copper foil was produced, the surface of copper foil was treated with Zn/Cr plating and organic dipping according to the following conditions.

| Zinc-Chromium Plating | |
|---|---|
| $CrO_3$ | 1 g/l |
| $Zn^{2+}$ | 420 ppm |
| $Na_2SO_4$ | 5 g/l |
| $P^{3+}$ | 320 ppm |
| Temperature | 37° C. |
| Current Density | 0.5 $A/dm^2$ |
| Time | 2 seconds |

The zinc content should be between 10-120 μg/$dm^2$ and the chromium content should be from 10 to 35 μg/$dm^2$, or the zinc/chromium ratio should be from 0.8 to 8. If Zn content is less than 10 μg/dm², the copper foil will oxidize after oven drying. If Zn content over 120 μg/dm², the sheet resistance of copper foil will increase. If Cr content is less than 10 μg/dm², copper foil easily oxidizes. If Cr content over 35 μg/dm², the sheet resistance of copper foil also increases (which will increase the inner resistance of a battery).

| Organic Treatment | |
|---|---|
| CH$_3$Si(OCH$_3$)$_3$ (KBM-13 Silane) | 0.25 wt % |
| Temperature | ~22° C. (room temp) |
| Immersion Time | 5 sec |
| Drying Conditions | 105° C. for 5 sec |

The surface tension of the surface-treated copper foil should be from 34 to 58 dyne/cm and the surface roughness (Rz) should be from 0.8 to 2.5 μm. If the surface tension is above 58 dyne/cm, the adhesion between the copper foil and the carbon active material layer is not sufficient. If the surface tension is below 34 dyne/cm, it become similar to the surface tension of PDVF and the dispersibility of the PVDF is not sufficient. If the surface roughness is less than 0.8 μm, it has a higher affinity to water, which is not ideal for the solvent slurry. If the surface roughness is greater than 2.5 μm, the carbon slurry is not uniform.

EXAMPLE 2

Coating the Electrolytic Copper Foil

A solvent-type anode slurry was prepared using N-methyl-2-pyrrolidone (NMP) as a solvent and the anode materials listed in the table below with a solid-liquid ratio of 60% (100 g of anode materials; 60 g of NMP).

| Anode Material | % Based on Total Weight of Anode Materials |
|---|---|
| Anode Active Material (Mesophase Graphite Powder Anode; MGPA) | 93.9 wt % |
| Conductive additive (Conductive Carbon Black; Super P ®) | 1 wt % |
| Solvent-Based Binder (PVDF6020, i.e., polyvinylidene fluoride) | 5 wt % |
| Oxalic Acid | 0.1 wt % |

After the components of the anode material formulation are mixed, the carbon material slurry is coated on the surface of copper foil at a speed of 5 meters per minute to a thickness of 200 μm and then dried through a 160° C. oven.

EXAMPLE 3

Peel Strength

A solvent-type anode active material slurry was coated on the surface-treated copper foil and dried. The anode (copper foil+anode active material) was then pressed. The dimension of the rollers of the pressing machine were φ250 mm×250 mm, hardness of the rollers was 62~65° HRC, and the roller material was high-carbon chrome bearing steel (SUJ2). A 1 M/min pressing speed and 5000 kg pressure was used until the density of anode active material layer was 1.5 g/cm³. The anode (after pressing) was cut to obtain a test sample in the size of 200 mm×20 mm (length×width). 3M Scotch® Magic™ tape was attached to the surface of test sample, and then the peel strength was measured using Model DS2-20N force measurement machine of IMADA. After the peel strength test, the breaking interface was observed to see the breaking interface. When the surface of the copper foil was only treated with chromate, the breaking interface was between the carbonaceous layer and the copper foil, thereby indicating poor adhesion (there was a clean break between the foil surface and the carbonaceous layer). Poor adhesion results in easy breakdown of the anode upon charging and discharging.

When the copper foil of the instant disclosure (copper foil having a zinc-chromium layer and a silane treatment) was tested, the breaking interface was in the carbonaceous layer (not between the foil surface and the carbonaceous layer). In other words, the carbonaceous layer did not separate from the surface of the foil. Instead, the carbonaceous layer broke apart (peeled from itself).

EXAMPLE 4

Surface Tension

The surface tension of copper foil was measured using a dyne pen. First, a low value dyne value pen was used on the copper foil. If the ink continuously covers the copper foil surface without breaking, the surface tension of copper foil is larger than this dyne value. Higher dyne value pens are subsequently used to repeat the process. When the ink breaks, the surface tension of the copper foil is determined. The surface tension of surface-treated copper foil of the instant disclosure was in the range of 34 to 58 dyne/cm.

EXAMPLE 5

Oven Test

The surface-treated copper foil of the instant disclosure was placed in an oven at 160° C. for 10 minutes, then visually inspected for signs of discoloration (oxidation). The surface-treated copper foil did not exhibit discoloration, i.e., it did not appear to oxidize.

EXAMPLE 6

Constant Temperature and Constant Humidity Test

The surface-treated copper foil of the instant disclosure was placed in an oven at 70° C.*80% RH for 15 hours to test for discoloration (oxidation). After 15 hours, the copper foil was visually inspected. The surface-treated copper foil did not exhibit discoloration, i.e., it did not appear to oxidize.

EXAMPLE 7

High C-Rate Charging and Discharging Test

A lithium ion secondary battery was prepared as follows and subjected to a high c-rate charging and discharging test. N-methyl-2-pyrrolidone (NMP) was used as a solvent for a cathode material (at a solid to liquid ratio of 195 wt % (100 g of the cathode material: 195 g of NMP)) as shown in table below, so as to obtain a cathode slurry. NMP was used as a solvent for an anode material (at a solid to liquid ratio of 60 wt % (100 g of the anode material: 60 g of NMP)), so as to obtain an anode slurry.

| Cathode material formulation: Based on the total weight of the cathode material | |
|---|---|
| Cathode active substance (LiCoO$_2$) | 89 wt % |
| Conductive additive (Flaked graphite; KS6) | 5 wt % |
| Conductive additive (Conductive carbon powder; Super P) | 1 wt % |
| Solvent-Based Binder (PVDF1300) | 5 wt % |
| Anode material formulation: Based on the total weight of the anode material | |
| Anode active substance (MGPA) | 93.9 wt % |
| Conductive additive (Conductive carbon powder; Super P) | 1 wt % |
| Solvent-Based Binder (PVDF6020) | 5 wt % |
| Oxalic acid | 0.1% |

Then, the cathode slurry was coated on aluminum foil, and the anode slurry was coated on the electrolytic copper foils. After the solvents evaporated, the anode and cathode were pressed and slitted into certain sizes. Afterwards, a cathode electrode, two separators (manufactured by Celgard Company), and an anode electrode were winded together, and placed in a container. The container was filled with an electrolyte, and sealed to form a battery. The size of the battery was 41 mm×34 mm×53 mm.

The charging mode was the constant current-constant voltage (CCCV) mode, the charging voltage was 4.2V, and the charging current was 5C. The discharging mode was the constant current (CC) mode, the discharging voltage was 2.8 V, and the discharging current was 5C. The charging-discharging test on the batteries was conducted at high temperature (at 55° C.).

Measurements

Surface Roughness: Roughness was measured using according to JIS B 0601-1994 using an a-type surface roughness measuring instrument (Kosaka Laboratory Ltd; SE 1700 Series).

Zn/Cr Content: The zinc and chromium content was determined cutting the copper foil to a size of 150×150 mm and placing a protective coating on one side of the copper foil (the coating prevents one side of the copper foil from dissolving). After drying, the specimen was further cut into a size of 100×100 mm (area=1 dm$^2$). The specimens were then put into a dish and dissolved with 20 ml of 18% HCl solution. After the Zinc and chromium on the surface of copper foil were dissolved completely, the solution was poured from the dish into a 50 ml volumetric flask. The disk was rinsed with water, which was used to reach the final volume. The amount of zinc and chromium was measured according to ICP-AES.

TABLE 1

| Example | 1 | 2 | 3 | 4 | 5 | 6 | 7 | 8 | 9 | 10 |
|---|---|---|---|---|---|---|---|---|---|---|
| Thickness (um) | 6 | 6 | 6 | 8 | 8 | 10 | 12 | 12 | 12 | 12 |
| Tensile strength (kg/mm$^2$) | 32.1 | 32.6 | 52.3 | 55.7 | 33.1 | 31.2 | 32.2 | 34.3 | 32.5 | 31.6 |
| Elongation (%) | 5.6 | 5.1 | 4.2 | 5.2 | 13.2 | 10.2 | 8.2 | 9.5 | 14.6 | 12.7 |
| S side Rz (μm) | 1.04 | 0.81 | 1.60 | 2.47 | 1.23 | 1.56 | 0.95 | 1.12 | 2.38 | 1.66 |
| M side Rz (μm) | 1.42 | 0.83 | 1.54 | 2.39 | 1.62 | 1.72 | 1.02 | 0.86 | 2.48 | 1.58 |
| Surface treatment | Zn/Cr + Organic | | | | | | | | | |
| S side surface tension (dyne/cm) | 44 | 58 | 40 | 34 | 48 | 38 | 58 | 56 | 36 | 38 |
| M side surface tension (dyne/cm) | 42 | 58 | 40 | 34 | 46 | 36 | 56 | 58 | 36 | 40 |
| S side Zn content (μm/dm$^2$) | 30 | 121 | 108 | 58 | 69 | 98 | 33 | 68 | 96 | 118 |
| S side Cr content (μm/dm$^2$) | 35.1 | 15.2 | 21.2 | 24.1 | 32.6 | 26.5 | 34.2 | 23.8 | 24.6 | 15.4 |
| S side Zn/Cr ratio | 0.85 | 7.96 | 5.09 | 2.42 | 2.12 | 3.70 | 0.96 | 2.86 | 3.90 | 7.66 |
| M side Zn content (μm/dm$^2$) | 30.2 | 119 | 112 | 56 | 72 | 102 | 31.8 | 66 | 94 | 112 |
| M side Cr content (μm/dm$^2$) | 34.8 | 16.2 | 20.6 | 21.0 | 33.2 | 24.5 | 33.2 | 25.1 | 24.2 | 16.2 |
| M side Zn/Cr ratio | 0.87 | 7.34 | 5.43 | 2.67 | 2.17 | 4.16 | 0.96 | 2.63 | 3.88 | 6.91 |
| Peel strength of anode active layer (kg) | 0.23 | 0.22 | 0.23 | 0.24 | 0.23 | 0.24 | 0.23 | 0.23 | 0.24 | 0.23 |
| Breaking interface after peel strength | A | A | A | A | A | A | A | A | A | A |
| Oven test | ○ | ○ | ○ | ○ | ○ | ○ | ○ | ○ | ○ | ○ |
| Constant temperature and humidity test | ○ | ○ | ○ | ○ | ○ | ○ | ○ | ○ | ○ | ○ |
| High C-rate cycle life test (time) | 1256 | 1208 | 1285 | 1267 | 1265 | 1276 | 1235 | 1268 | 1296 | 1282 |

| Example | 11 | 12 | 13 | 14 | 15 | 16 | 17 | 18 | 19 |
|---|---|---|---|---|---|---|---|---|---|
| Thickness (um) | 20 | 12 | 10 | 6 | 6 | 8 | 8 | 12 | 12 |
| Tensile strength (kg/mm$^2$) | 30.8 | 33 | 61.5 | 32.5 | 33.6 | 32.7 | 53.9 | 34.2 | 33.4 |
| Elongation (%) | 22.1 | 12.5 | 10 | 5.6 | 6.5 | 7.4 | 5.8 | 10.2 | 12.2 |
| S side Rz (μm) | 1.08 | 1.7 | 1.39 | 0.68 | 1.58 | 1.48 | 1.23 | 1.12 | 1.56 |
| M side Rz (μm) | 0.80 | 1.36 | 1.36 | 0.56 | 1.34 | 1.36 | 1.32 | 1.31 | 1.22 |
| Surface treatment | Zn/Cr + Organic | Zn/Cr + Organic | Zn/Cr + Organic | Zn/Cr + Organic | Zn/Cr + Organic | Zn/Cr + Organic | Cr + Organic | Cr | Zn/Cr |
| S side surface tension (dyne/cm) | 56 | 36 | 36 | 58 | 44 | 38 | 46 | 64 | 62 |
| M side surface tension (dyne/cm) | 56 | 36 | 38 | 58 | 42 | 38 | 48 | 62 | 62 |
| S side Zn content (μm/dm$^2$) | 36.2 | 13.2 | 19.5 | 116 | 22.3 | 116 | 0 | 0 | 76 |
| S side Cr content (μm/dm$^2$) | 16.6 | 11.9 | 14.8 | 26.5 | 32.6 | 11.4 | 25.6 | 23.2 | 24.5 |
| S side Zn/Cr ratio | 2.18 | 1.11 | 1.32 | 4.38 | 0.68 | 10.18 | — | — | 3.10 |
| M side Zn content (μm/dm$^2$) | 34.5 | 12.4 | 20.2 | 109 | 24.7 | 119 | 0 | 0 | 72 |

TABLE 1-continued

| | | | | | | | | | |
|---|---|---|---|---|---|---|---|---|---|
| M side Cr content (μm/dm$^2$) | 17.2 | 10.1 | 13.6 | 24.2 | 33.4 | 11.2 | 26.7 | 22.1 | 25.2 |
| M side Zn/Cr ratio | 2.00 | 1.23 | 1.49 | 4.50 | 0.74 | 10.63 | 2.86 | | |
| Peel strength of anode active layer (kg) | 0.23 | 0.24 | 0.24 | 0.19 | 0.23 | 0.23 | 0.23 | 0.20 | 0.21 |
| Breaking interface after peel strength | A | A | A | C | A | A | A | C | C |
| Oven test | ○ | ○ | ○ | ○ | ○ | ○ | x | x | ○ |
| Constant temperature and humidity test | ○ | ○ | ○ | ○ | ○ | x | ○ | ○ | ○ |
| High C-rate cycle life test (time) | 1210 | 1288 | 1256 | 826 | — | 1215 | — | — | 892 |

In the Oven Test and the Constant Temperature and Humidity Test, "O" indicates no discoloration to slight discoloration; "X" indicates severe discoloration. If the copper foil showed discoloration after the Oven Test, it was not used in the High C-Rate Charging and Discharging Test.

A=Breaking in the anode (the carbon layer breaks)

C=Clean break between the foil and the carbon layer (the carbon layer cleanly separated from the copper layer).

The above embodiments are only used to illustrate the principle of the present disclosure and the effect thereof, and should not be construed as to limit the present disclosure. The above embodiments can be modified and altered by those skilled in the art, without departing from the spirit and scope of the present disclosure. Therefore, the protection scope of the present disclosure is defined in the following appended claims. As long as it does not affect the effects and achievable goals of this disclosure, it should be covered under the technical contents disclosed herein.

The terms "comprising," "having," and "including" are used in their open, non-limiting sense. The terms "a" and "the" are understood to encompass the plural as well as the singular. The expression "at least one" means one or more and thus includes individual components as well as mixtures/combinations. The term "about" when referring to a value, is meant specifically that a measurement can be rounded to the value using a standard convention for rounding numbers. For example, "about 1.5" is 1.45 to 1.54. All valued set forth herein can be modified with the term "about" or recited without the term, regardless of whether the term "about" is specifically set forth (or is absent) in conjunction with any particular value. All ranges and values disclosed herein are inclusive and combinable. For examples, any value or point described herein that falls within a range described herein can serve as a minimum or maximum value to derive a sub-range, etc.

The invention claimed is:

1. A surface-treated copper foil having a surface tension of 34 to 58 dyne/cm and a surface roughness (Rz) of 0.8 to 2.5 μm, wherein the surface-treated copper foil comprises:
    (a) copper foil;
    (b) a zinc-chromium layer plated directly on one or both sides of the copper foil, wherein the zinc content in the zinc-chromium layer is from 10 to 120 μg/dm$^2$ and the chromium content in the zinc-chromium layer is from 10 to 35 μg/dm$^2$; and
    (c) an organic hydrophobic layer applied to the zinc-chromium layer.

2. The surface-treated copper foil of claim 1, wherein the zinc/chromium ratio is from 0.8 to 8.

3. The surface-treated copper foil of claim 1, wherein the copper foil has thickness of from 1 to 50 μm.

4. The surface-treated copper foil of claim 1, wherein the zinc content in the zinc-chromium layer is from 30 to 120 μg/dm$^2$ and chromium content in the zinc-chromium layer is from 15 to 35 μg/dm$^2$.

5. The surface-treated copper foil of claim 1, wherein the organic hydrophobic layer comprises at least one hydrophobic compound selected from the group consisting of substituted or unsubstituted: 1,2,3-benzotriazole, an alkoxysilane having 1 to 20 carbons, a vinylalkoxy silane having 1 to 20 carbons, and (meth)acryl silane.

6. The surface-treated copper foil of claim 5, wherein the organic hydrophobic layer comprises an alkoxysilane having 1 to 20 carbons.

7. The surface-treated copper foil of claim 6, wherein the alkoxysilane is $CH_3Si(OCH_3)_3$.

8. The surface-treated copper foil of claim 1 having a surface tension of 40 to 50 dyne/cm and a surface roughness (Rz) of 1.0 to 2.0 μm.

9. An anode comprising an anode active material on an anode current collector, wherein the anode current collector comprises a surface-treated copper foil of claim 1.

10. The anode of claim 9, wherein the anode active material layer contains a carbon material.

11. The anode of claim 10, wherein the carbon material is selected from the group consisting of non-graphitizing carbon, artificial graphite, coke, graphite, glasslike carbon, carbon fiber, activated carbon, and carbon black.

12. The anode of claim 10, wherein the anode active material layer comprises a conductive material, a binder, and a non-aqueous solvent.

13. The anode of claim 12, wherein the binder is polyvinylidene fluoride (PVDF), Poly(vinylidene fluoride-co-hexafluoropropylene) (PVDF-HFP), polyimide (PI), or a combination thereof.

14. The anode of claim 12, wherein the non-aqueous solvent is 1-methyl-2-pyrrolidone (NMP).

15. A lithium ion secondary battery comprising a cathode, an anode according to claim 9, a separator interposed between the cathode and anode, and an electrolyte.

16. The lithium ion secondary battery of claim 15, wherein the cathode comprises a composite lithium oxide.

17. An electronic device comprising the battery of claim 15 selected from the group consisting of a power tool, an electric vehicle, a cell phone, a tablet, and a portable electronic device.

18. A process for making the surface-treated copper foil of claim 1 comprising:
    (a) performing an electrochemical reaction to produce copper foil;
    (b) electroplating a zinc-chromium layer onto one or both sides of the copper foil; and
    (c) applying an organic hydrophobic layer onto the zinc-chromium layer.

19. The process of claim 18, further comprising:
    drying the surface-treated copper foil at a temperature between 50° C. and 150° C. after applying the hydrophobic layer.

20. A process for making an anode comprising:
(a) applying an anode active material to one or both sides of the surface-treated copper foil of claim 1, which acts as an anode current collector;
(b) curing the anode active material; and
(c) pressing the anode active material that has been applied to the surface-treated copper foil and cured.

* * * * *